(12) United States Patent
Demosthene

(10) Patent No.: US 9,445,672 B2
(45) Date of Patent: Sep. 20, 2016

(54) PORTABLE SEAT COVER DEVICE

(71) Applicant: Nirva Demosthene, Bridgeport, CT (US)

(72) Inventor: Nirva Demosthene, Bridgeport, CT (US)

( * ) Notice: Subject to any disclaimer, the term of this patent is extended or adjusted under 35 U.S.C. 154(b) by 0 days.

(21) Appl. No.: 14/560,060

(22) Filed: Dec. 4, 2014

(65) Prior Publication Data

US 2016/0157619 A1 Jun. 9, 2016

(51) Int. Cl.
*A47C 7/62* (2006.01)
*F16B 1/00* (2006.01)

(52) U.S. Cl.
CPC . *A47C 7/62* (2013.01); *F16B 1/00* (2013.01); *F16B 2001/0028* (2013.01)

(58) Field of Classification Search
CPC .. A45C 3/10; A45C 2009/002; A47C 7/425; A47C 31/10; A47C 31/11
USPC ....... 5/417, 419; 297/219.1, 223, 228.1, 229
See application file for complete search history.

(56) References Cited

U.S. PATENT DOCUMENTS

| | | | | |
|---|---|---|---|---|
| 2,738,834 A * | 3/1956 | Jaffe | ......................... | A47G 9/10 5/420 |
| 4,154,323 A * | 5/1979 | Sneider | ..................... | A45C 9/00 5/417 |
| 4,273,380 A * | 6/1981 | Silvestri | ................... | A45C 9/00 297/188.06 |
| 4,671,393 A * | 6/1987 | Rainey | ..................... | A45C 3/10 190/1 |
| 5,275,463 A | 1/1994 | Rocha | | |
| 5,649,658 A * | 7/1997 | Hoffman | ................... | A45F 3/04 5/655 |
| 5,693,398 A * | 12/1997 | Granger | ................... | A45C 3/10 5/417 |
| 5,774,912 A * | 7/1998 | Dominique | .............. | A45C 3/10 5/417 |
| 6,030,034 A * | 2/2000 | Plohetski | ............... | A47C 7/383 297/188.06 |
| 6,773,062 B2 | 8/2004 | Illulian | | |
| 6,948,771 B1 | 9/2005 | Salandy | | |
| D569,673 S * | 5/2008 | Gostt | ............................ | D6/595 |
| 7,387,335 B1 | 6/2008 | Meek et al. | | |
| D660,070 S | 5/2012 | Lugo | | |
| 2002/0074251 A1* | 6/2002 | Hirshberg | ................ | A45C 9/00 206/315.1 |
| 2006/0049672 A1* | 3/2006 | Terrell | ..................... | A47C 4/52 297/17 |
| 2009/0028466 A1 | 1/2009 | Bailey | | |
| 2010/0140994 A1 | 6/2010 | Moore | | |
| 2011/0198895 A1 | 8/2011 | Friedman et al. | | |

\* cited by examiner

*Primary Examiner* — Sarah McPartlin

(57) ABSTRACT

A portable seat cover device facilitates carrying of a seat cover to position over public chairs. The device includes a cover having a front face, a back face, and a perimeter edge extending around and between the front face and the back face. A bag is coupled to and extends from the perimeter edge of the cover. The bag has a peripheral edge defining an opening into an interior space of the bag. The cover is selectively positionable to occupy the interior space of the bag. A flap is coupled to the peripheral edge of the bag and is selectively extendable over the opening of the bag. A resilient member is coupled to the flap extending around a free edge of the flap. The resilient member engages the cover and the bag inhibiting the cover from coming out of the interior space of the bag.

8 Claims, 6 Drawing Sheets

PORTABLE SEAT COVER DEVICE

BACKGROUND OF THE DISCLOSURE

Field of the Disclosure

The disclosure relates to seat cover devices and more particularly pertains to a new seat cover device for facilitating carrying of a seat cover to position over public chairs and the like to inhibit exchange of dirt, germs, and the like.

SUMMARY OF THE DISCLOSURE

An embodiment of the disclosure meets the needs presented above by generally comprising a cover having a front face, a back face, and a perimeter edge extending around and between the front face and the back face. A bag is coupled to and extends from the perimeter edge of the cover. The bag has a peripheral edge defining an opening into an interior space of the bag. The cover is selectively positionable to occupy the interior space of the bag. A flap is coupled to the peripheral edge of the bag and is selectively extendable over the opening of the bag. A resilient member is coupled to the flap extending around a free edge of the flap. The resilient member engages the cover and the bag inhibiting the cover from coming out of the interior space of the bag.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
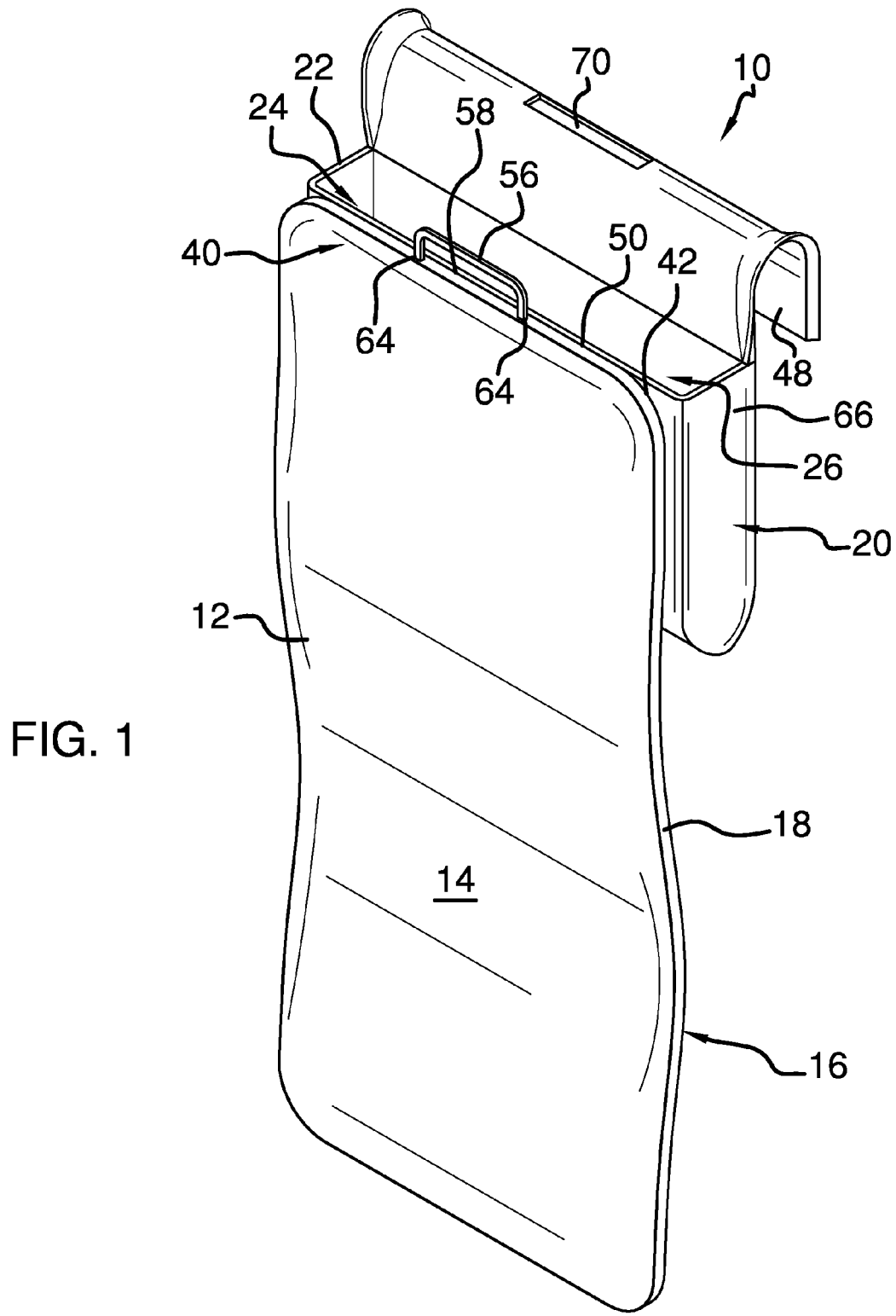
FIG. 1 is a top front side perspective view of a portable seat cover device according to an embodiment of the disclosure.
Figure 2:
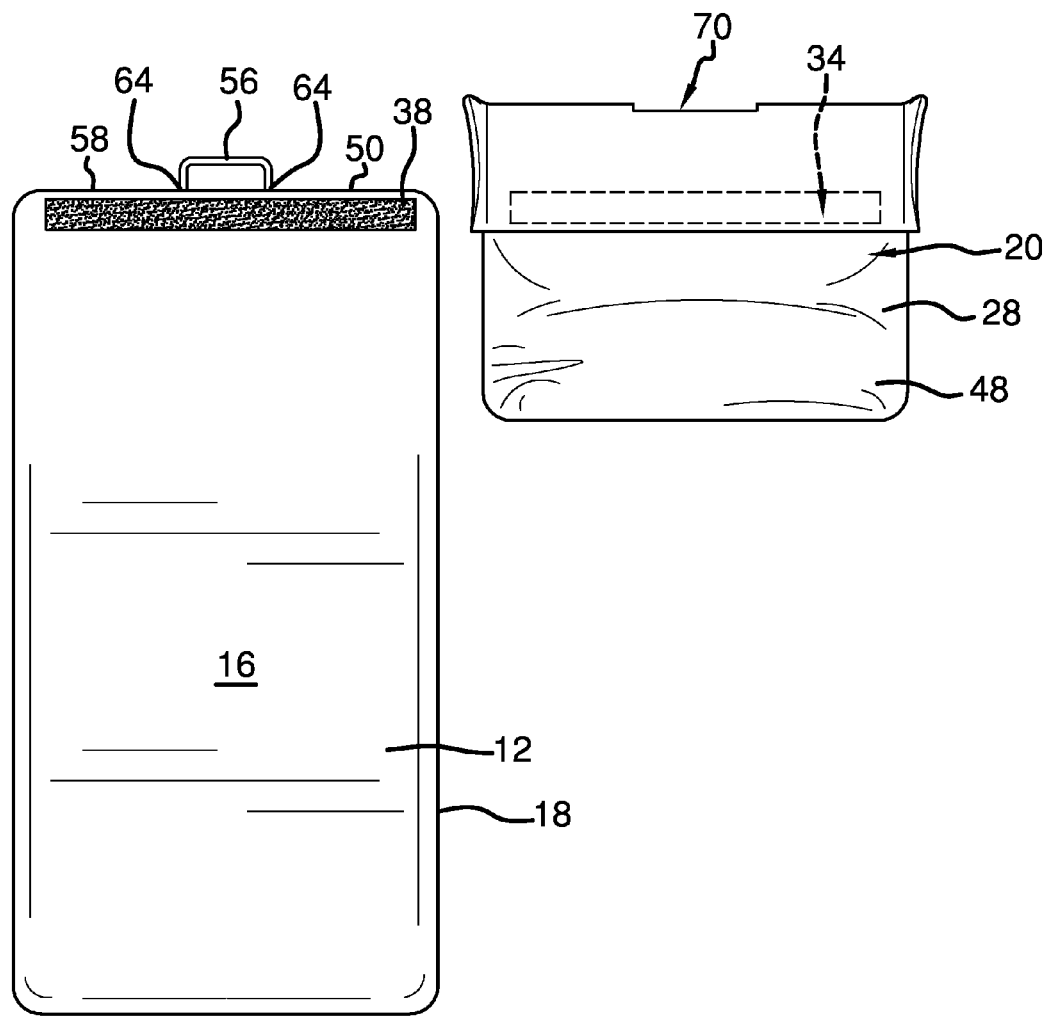
FIG. 2 is a back view of an embodiment of the disclosure.
Figure 3:
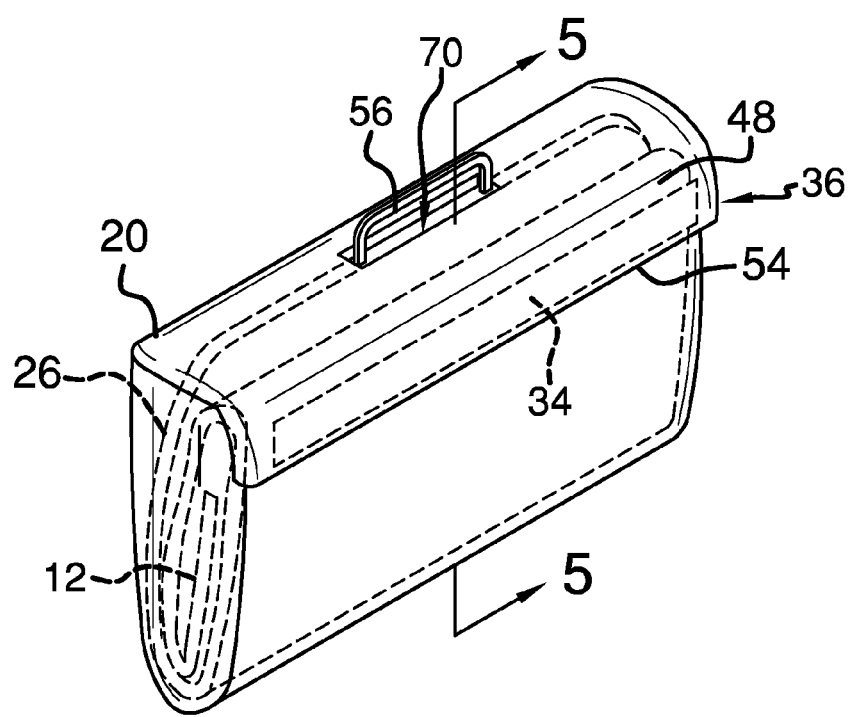
FIG. 3 is a top back side perspective view of an embodiment of the disclosure in a storage position.
Figure 4:
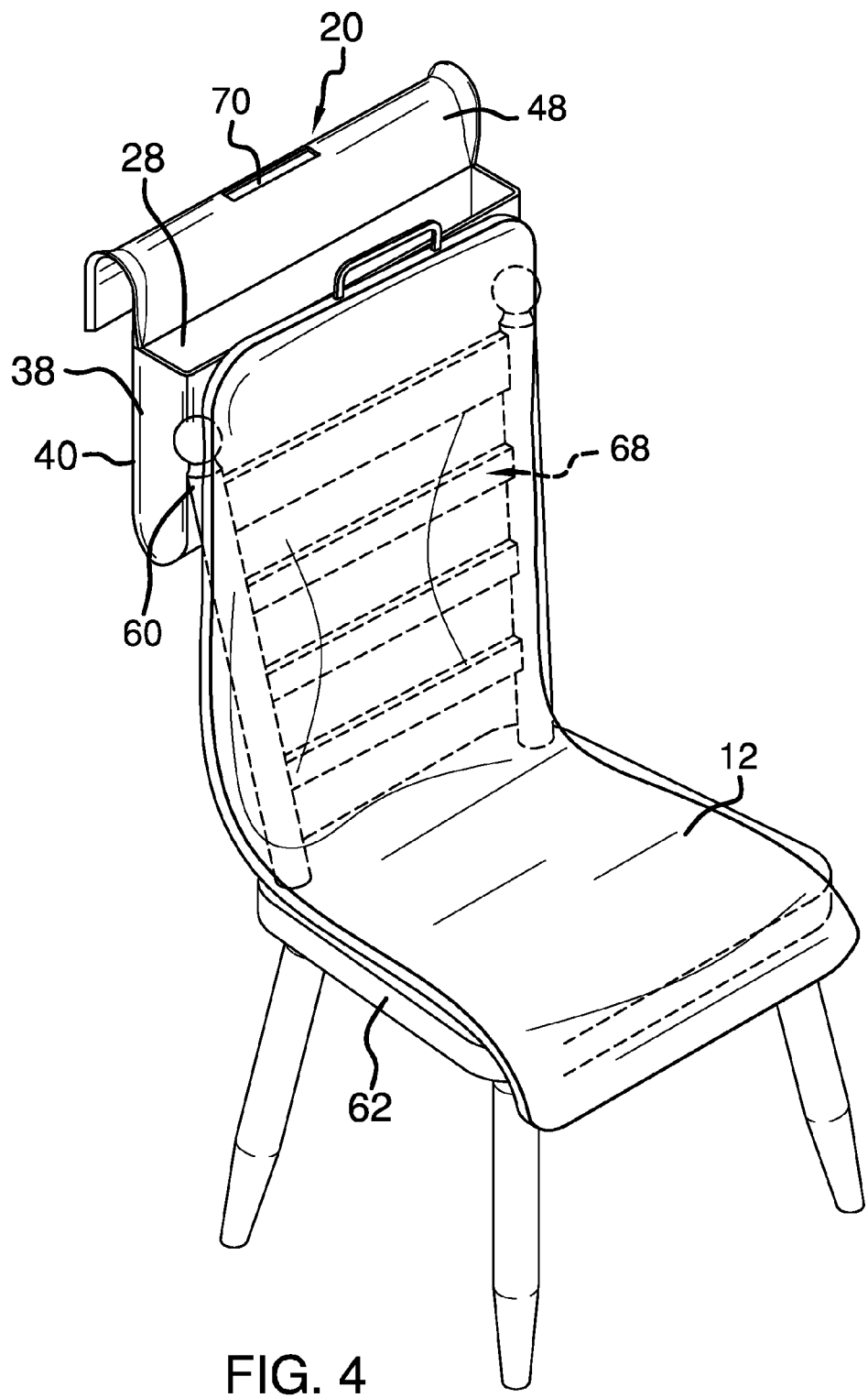
FIG. 4 is a top front side perspective view of an embodiment of the disclosure in a use position.
Figure 5:
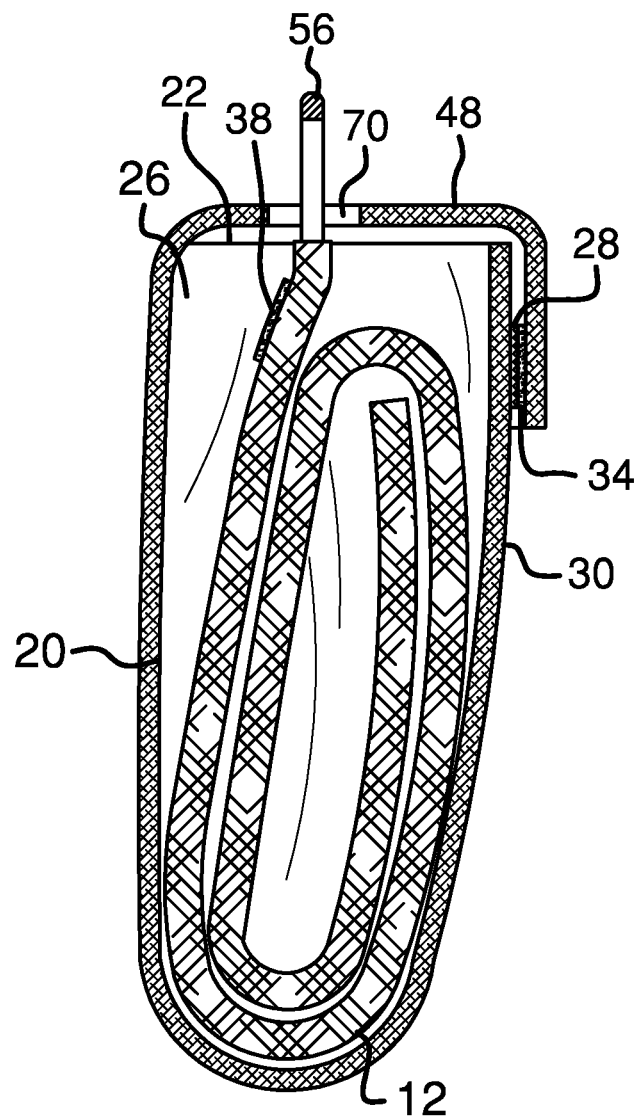
FIG. 5 is a cross-sectional view of an embodiment of the disclosure taken along line 5-5 of FIG. 3.
Figure 6:
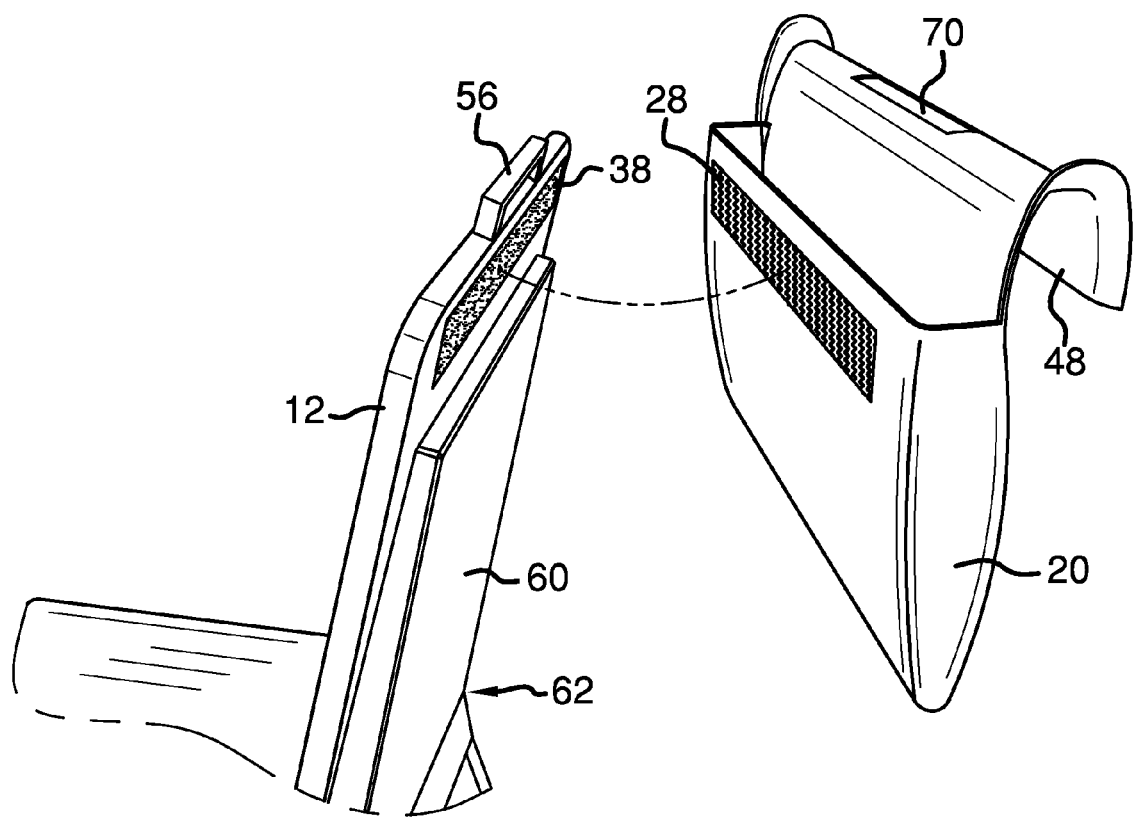
FIG. 6 is a partially exploded front side view of an embodiment of the disclosure in use.

With reference now to the drawings, and in particular to FIGS. 1 through 6 thereof, a new seat cover device embodying the principles and concepts of an embodiment of the disclosure and generally designated by the reference numeral 10 will be described.

As best illustrated in FIGS. 1 through 6, the portable seat cover device 10 generally comprises a cover 12 having a front face 14, a back face 16, and a perimeter edge 18 extending around and between the front face 14 and the back face 16. The cover 12 is constructed of a washable material of a conventional type. The cover 12 is rectangular for covering a full length of a seat 62. A peripheral wall 66 of a bag 20 has a peripheral edge 22 defining an opening 24 into an interior space 26 of the bag 20. The cover 12 is selectively positionable to occupy the interior space 26 of the bag 20.

A first fastener 28 is coupled to an exterior surface 30 of the bag 20. The first fastener 28 is elongated and positioned proximate and parallel to the peripheral edge 22 of the peripheral wall 66 of the bag 20. The first fastener 28 is a portion of hook and loop fastener 32.

A flap 48 is coupled to the peripheral edge 22 of the bag 20. The flap 48 is positioned opposite the first fastener 28 on the peripheral edge 22 of the bag 20. The flap 48 is selectively extendable over the opening 24 of the bag 20. A second fastener 34 is coupled to the flap 48. The second fastener 34 is engageable to the first fastener 28 wherein the flap 48 is secured in a closed position 36 extending over the opening 24 into the interior space 26 of the bag 20.

A third fastener 38 is coupled to the cover 12. The third fastener 38 is selectively couplable to the first fastener 28 wherein the cover 12 is selectively couplable to the bag 20 while the flap 48 is in an open position 40 as shown in FIG. 1. The third fastener 38 is coupled to the cover 12 proximate a top edge 58 of the cover 12 wherein the first fastener 28 and the third fastener 38 are configured for positioning the bag 20 and the cover 12 on opposite sides of a back 60 of a seat 62 such that the cover 12 is positionable to extend over a front side 68 of the back 60 of the seat 62.

A handle 56 is coupled to the cover 12. The handle 56 is positioned along the top edge 58 of the cover 12. The handle 56 has opposite ends 64 coupled to the perimeter edge 18 of the perimeter edge 18 of the cover 12. A slot 70 extends through the flap 48. The handle 56 is insertable through the slot 70 when the cover 12 is positioned in the interior space 26 of the bag 20. With the second fastener 34 being coupled to the first fastener 28, the bag 20 may be carried by grasping the handle 56.

In use, the cover 12 is removed from the interior space 26 of the bag 20 after disengaging the second fastener 34 from the first fastener 28. The third fastener 38 is engaged to the first fastener 28 and the bag 20 is positioned over a top of the seat 62 allowing the cover 12 to extend over the seat 62. The cover 12 may be stored and transported by folding or rolling the cover 12 and placing the cover 12 into the interior space 26. The flap 48 is extended over the opening 24 with the handle 56 extending through the slot 70 and the second fastener 34 is re-engaged to the first fastener 28 to hold the cover 12 in the bag 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable seat cover device comprising:
   a cover having a front face, a back face, and a perimeter edge extending around and between said front face and said back face;
   a bag, a peripheral wall of said bag having a peripheral edge defining an opening into an interior space of said bag, said cover being selectively positionable to occupy said interior space of said bag;
   a first fastener coupled to an exterior surface of said bag;
   a flap coupled to said peripheral edge of said bag, said flap being positioned opposite a coupled section of said peripheral edge of said bag, said flap being selectively extendable over said opening of said bag;
   a second fastener coupled to said flap, said second fastener being engageable to said first fastener wherein said flap is secured in a closed position extending over said opening into said interior space of said bag;
   a third fastener, said third fastener being coupled to said cover, said third fastener being selectively couplable to said first fastener wherein said cover is selectively couplable to said bag while said flap is in an open position;
   a handle coupled to said cover, said handle being positioned along a top edge of said perimeter edge of said cover; and
   a slot extending through said flap, said handle being insertable through said slot when said cover is positioned in said interior space of said bag.

2. The device of claim 1, further comprising said handle having opposite ends coupled to said perimeter edge of said cover.

3. The device of claim 1, further comprising said cover being constructed of a washable material.

4. The device of claim 1, further comprising said cover being rectangular.

5. The device of claim 1, further comprising said first fastener being elongated and positioned proximate and parallel to said peripheral edge of said peripheral wall of said bag.

6. The device of claim 5, further comprising said first fastener being a portion of hook and loop fastener.

7. The device of claim 5, further comprising said third fastener being coupled to said cover proximate a top edge of said cover wherein said first fastener and said third fastener are configured for positioning said bag and said cover on opposite sides of a back of a seat such that said cover is positionable to extend over a front side of the back of the seat.

8. A portable seat cover device comprising:
   a cover having a front face, a back face, and a perimeter edge extending around and between said front face and said back face, said cover being constructed of a washable material, said cover being rectangular;
   a bag, a peripheral wall of said bag having a peripheral edge defining an opening into an interior space of said bag, said cover being selectively positionable to occupy said interior space of said bag;
   a first fastener coupled to an exterior surface of said bag, said first fastener being elongated and positioned proximate and parallel to said peripheral edge of said peripheral wall of said bag, said first fastener being a portion of hook and loop fastener;
   a flap coupled to said peripheral edge of said bag, said flap being positioned opposite a coupled section of said peripheral edge of said bag, said flap being selectively extendable over said opening of said bag;
   a second fastener coupled to said flap, said second fastener being engageable to said first fastener wherein said flap is secured in a closed position extending over said opening into said interior space of said bag; and
   a third fastener, said third fastener being coupled to said cover, said third fastener being selectively couplable to said first fastener wherein said cover is selectively couplable to said bag while said flap is in an open position, said third fastener being coupled to said cover proximate a top edge of said cover wherein said first fastener and said third fastener are configured for positioning said bag and said cover on opposite sides of a back of a seat such that said cover is positionable to extend over a front side of the back of the seat;
   a handle coupled to said cover, said handle being positioned along a top edge of said perimeter edge of said cover, said handle having opposite ends coupled to said perimeter edge of said cover; and
   a slot extending through said flap, said handle being insertable through said slot when said cover is positioned in said interior space of said bag.

* * * * *